Figure 1:
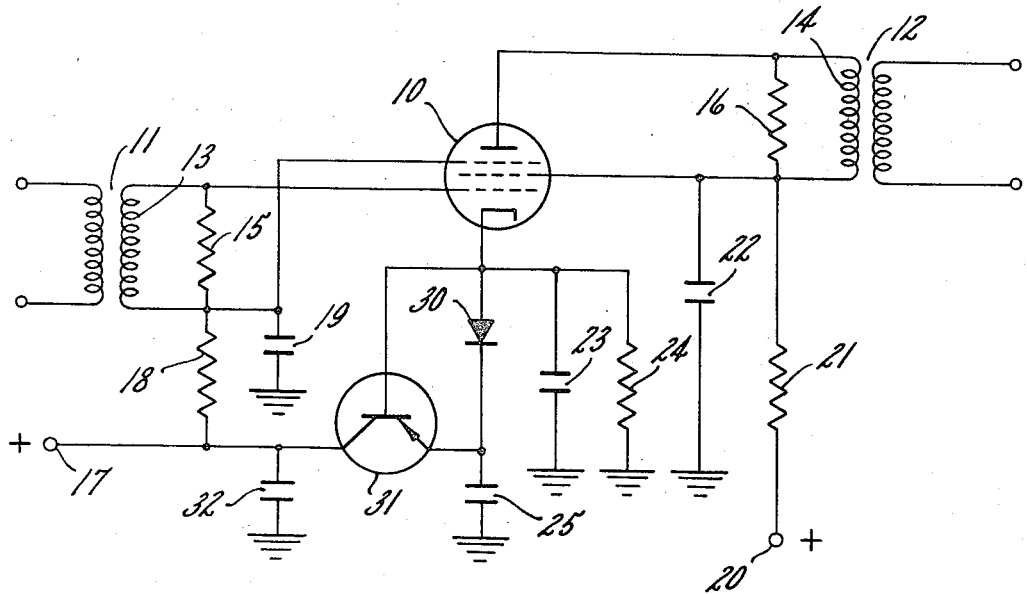

United States Patent
Stull, Jr.

[11] 3,854,136
[45] Dec. 10, 1974

[54] CIRCUIT FOR FAST RECOVERY FROM JAMMING IN A RADAR RECEIVER SYSTEM WITH LARGE DYNAMIC RANGE

[75] Inventor: Keefer S. Stull, Jr., Baltimore, Md.

[73] Assignee: The United States of America as represented by the Secretary of the Navy, Washington, D.C.

[22] Filed: May 5, 1964

[21] Appl. No.: 365,570

[52] U.S. Cl. ............ 343/18 E, 325/479, 343/17.1 R
[51] Int. Cl. ............................ G01s 7/28, G01s 7/36
[58] Field of Search ................... 343/17.1, 18, 18 E; 325/479

[56] References Cited
UNITED STATES PATENTS
3,121,224  2/1964  Bachmann ..................... 343/17.1 X
3,125,755  3/1964  Williams ........................ 343/17.1

*Primary Examiner*—Malcolm F. Hubler
*Attorney, Agent, or Firm*—R. S. Sciascia; P. S. Collignon

EXEMPLARY CLAIM

6. A circuit coupled to the intermediate frequency circuit of a radar receiver to provide fast recovery from jamming signals comprising:

an intermediate frequency pentode amplifier, having an input coupled to the control and suppressor grids and an output coupled to the screen grid and anode, and having a cathode coupled to a neutral potential through a parallel resistance and first capacitance network;

a diode and a second capacitor coupled in series between said cathode and said neutral potential, said diode being oriented with the anode thereof coupled to said cathode; and a PNP transistor switching circuit having a base input thereto coupled to said pentode cathode, an emitter input thereto coupled to the cathode of said diode, and collector output means coupled to a biasing voltage whereby, upon the occurrence of a jamming signal on the input to said pentode, the cathode voltage thereof will rise in accordance with the charging rate of said second capacitor preventing pentode saturation for a jamming pulse time interval and allowing real target signals to be amplified and, upon reduction of a jamming signal on the input to said pentode, the cathode voltage thereof will decrease producing a voltage differential across the inputs of said transistor switching circuit to switch same into conduction and reduce the second capacitor voltage as rapidly as said jamming signal to immediately relieve back-bias on said pentode allowing real target signals to be amplified.

9 Claims, 2 Drawing Figures

INVENTOR.
KEEFER S. STULL, JR.
BY
H. H. Losche
ATT'YS.

CIRCUIT FOR FAST RECOVERY FROM JAMMING IN A RADAR RECEIVER SYSTEM WITH LARGE DYNAMIC RANGE

This invention relates to antijamming circuits for radar receivers and more particularly to a circuit for coupling to the intermediate frequency (IF) amplifier of a radar receiver to produce fast recovery from interfering signals which saturate and cut off the amplifier to obscure and blank real targets.

An important problem in the operation of a radar receiver is the detection of a weak target signal in the presence of strong interfering signals, such as clutter or jamming signals. An ordinary receiver would be completely saturated by strong interference and the target would not appear at the receiver output. A well known method to prevent saturation is to design a receiver whose output is the logarithm of the input; however, with such a system the target signal is attenuated by the ratio of its amplitude to that of the interfering signal. In the presence of very strong interfering signals the target is attenuated to such a low level that it will not permit the operation of automatic range and angle tracking circuits.

Another known method of accommodating strong interfering signals but without greatly affecting the level of the desired target signal is by "backbiased" operation of the IF postamplifier stages. This mode of operation is obtained as follows: The IF amplifiers are operated with a positive grid bias supply and a high value of cathode bias resistance. When a strong interfering signal is applied, the nonlinear transfer characteristic of the tube creates a direct current component of plate current which flows through the cathode bias resistor, thus increasing the bias enough to allow the strong signal to be accommodated without driving the grid positive into saturation.

A target signal will appear as a beat on the envelope of the interfering signal and it will fall on the linear portion of the transfer curve and be amplified normally if the cathode bypass capacitor is large enough to prevent the bias from changing appreciably for the duration of the target pulse. Such an arrangement is very effective against continuous wave (CW) interference and against amplitude modulation (AM) if the modulating frequency is sufficiently low (typically below 100 KC/S). If the strong interfering signal has a fast rise or a fast fall, the amplifier will be saturated or cut off for a short period (typically a few microseconds) until the cathode capacitor charges to its new equilibrium value. Therefore, if the interference is in the form of pulses or high frequency AM (such as white noise) the back-bias mode is not very effective, but its superior performance against CW and some forms of AM and frequency modulated (FM) jamming justify its incorporation in a radar receiver.

In this invention the performance of a back-bias IF ampllifier of a radar is improved by decreasing the time for recovery from amplifier cutoff after the fast amplitude fall of an interfering or jamming signal. This is accomplished by using a normal cathode time constant, which typically is a few microseconds for back-bias operation, on increasing signals and a short cathode time constant, usually about 0.1 microsecond, for decreasing signals by automatically switching the size of the cathode capacitor. A transistor circuit having the emitter and base coupled in parallel with a diode, that is coupled to the cathode of the IF amplifier, automatically restores the cathode capacitor voltage to the proper value after the amplitude fall of the interfering signal level. The collector of the transistor is coupled to the positive grid bias voltage of the IF amplifier instead of to ground to decrease the power dissipated in the transistor when it discharges the cathode capacitor. In some applications where the current gain of a single transistor is not sufficiently high, this current gain can be effectively squared by cascading two transistors in the coupling from the IF amplifier cathode to the low positive voltage source, wherever desired. Cascading of three or more transistors could be used where current gain demands are required but in all probability cascading of two transistors would be sufficient for most applications. It is therefore a general object of this invention to provide a transistor circuit connected between the cathode of an IF amplifier in a radar receiver and its cathode capacitance across a diode in series with the cathode and cathode-capacitance to provide rapid recovery of a cutoff IF amplifier upon the decrease in amplitude of CW interfering or jamming signals to lower voltage amplitudes thereby permitting the amplification of real targets in a jamming signal environment.

Figure 2:
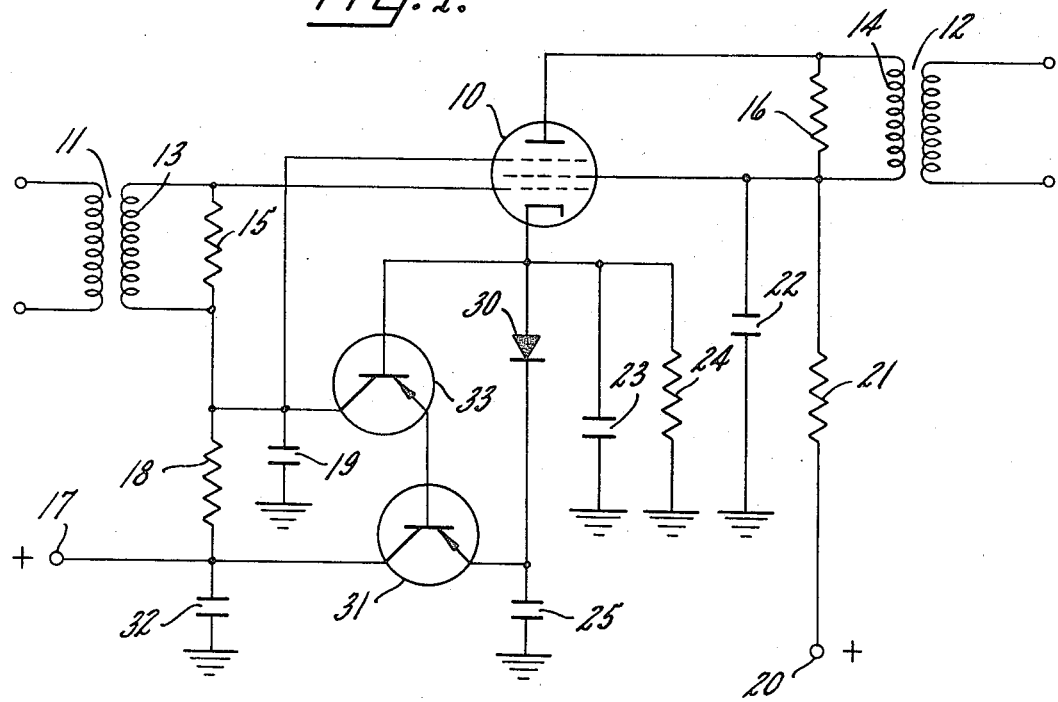

These and other objects and the attendant advantages, features, and uses of this invention will become more apparent to those of ordinary skill in the art as the description proceeds when considered along with the drawing in which:

FIG. 1 is a circuit schematic of the transistor circuit of this invention incorporated in one IF stage, and FIG. 2 shows a second modification of that of FIG. 1 in which two transistors are shown in cascade.

Referring more particularly to FIG. 1 there is illustrated an IF pentode stage of a radar receiver including a pentode 10, an input transformer 11, and an output transformer 12. Input transformer 11 has a secondary 13 thereof coupled across the control grid and suppressor grid of the pentode 10 while the primary winding 14 of the output transformer 12 is coupled across the screen grid and anode of the pentode 10, as is conventional of back-bias IF amplifier stages. The input transformer 11 is loaded by the resistor 15 while the output transformer 12 is loaded by resistor 16. Positive grid bias is supplied from a positive voltage source at 17 through a resistor 18 to the suppressor grid of pentode 10. This suppressor grid is also coupled to one plate of a capacitor 19 the other plate of which is coupled to a neutral potential, such as ground. This positive grid voltage 17, for the purpose of example herein, is typically 15 volts and is applied through the decoupling network 18 and 19. The anode and screen grid potential is applied from a voltage source 20 through a resistor 21 directly to the screen grid of the pentode 10. The screen grid is coupled to one plate of a capacitor 22, the opposite plate of which is grounded. The anode and screen grid potential applied at terminal 20, for the purpose of example herein, is typically 150 volts being applied through the decoupling network 21,22. The cathode of pentode 10 is coupled to the neutral potential through a parallel network consisting of a capacitor 23 and resistor 24. The capacitor 23 serves as a cathode bypass capacitor and is as small as possible while still giving a reasonable degree of IF bypassing in the 30 megacycle per second IF range. For the purpose of example, this cathode bypass capacitor 23 may be of about 100 pico farads (pf). The cathode resistor 24 is of a value to get proper back-bias operation for the value of voltage applied at terminal 17 and may be of the order of about 5,000 ohms. In the usual IF amplifier circuit a capacitor, such as 25 shown herein, is normally directly coupled to the cathode of the pentode 10 and is usually large enough to prevent the cathode voltage from increasing appreciably during one target pulse width. Capacitor 25, therefore, may be of about 3,300 pf, as an example herein, for operation.

In the present invention the cathode of pentode 10 has a diode 30 connected in series between the cathode and one plate of the cathode capacitor 25, the opposite plate of capacitor 25 being coupled to the neutral potential. The diode 30 may be of the vacuum tube or semi-conductor type but is oriented with its anode coupled to the cathode of pentode 10 and its cathode coupled to the capacitor 25. Diode 30 must have a reasonably high conductivity and a recovery time less than .1 microsecond to provide the best function and results for this invention. This invention also requires a PNP transistor 31 having its base coupled directly to the cathode of pentode 10 and its emitter coupled to the junction of the cathode of diode 30 and the upper plate of capacitor 25. The collector of transistor 31 is coupled directly to the grid biasing voltage source 17 and also to one plate of a capacitor 32, the opposite plate of which is coupled directly to the neutral potential. The transistor 31 must be of a very high speed PNP type and the capacitor 32 must be large enough to receive the charge from capacitor 25 through the emitter-collector circuit of transistor 31 without experiencing any appreciable voltage rise. Capacitor 32 of about 0.1 microfarad is typical for one example of operation of this invention.

FIG. 2 is substantially the same as the embodiment shown in FIG. 1 wherein like reference characters are applied to like parts in FIG. 2 as in FIG. 1, the modification being in the addition of a second PNP transistor 33 which is coupled in cascade with transistor 31. In this embodiment the collector of transistor 33 is coupled to the suppressor grid of the pentode 10.

OPERATION

In the operation of this invention, when no interfering signal is present, the desired target pulse is regulated to a level below which back-biasing of the pentode amplifier occurs. Under this condition the diode 30 and transistor 31 (or transistors 31 and 33) do not operate. If a strong CW jamming or interfering signal is applied suddenly by way of the input transformer 11 to the IF amplifier circuit, the cathode of pentode 10 will tend to go to a more positive voltage by virtue of its cathode following action. This will cause diode 30 to conduct and thereby connect capacitor 25 to the cathode which will delay the cathode voltage for several microseconds in reaching its new higher voltage level. As in an ordinary IF amplifier where the cathode is directly coupled to the capacitor 25, the amplifier would be saturated during this period and, if a target pulse occurred, it would be lost. After the higher voltage level of the cathode is reached and a target pulse occurs, the cathode voltage would tend to go more positive and, if it did, the target pulse would be substantially eliminated in the output of transformer 12 by instantaneous back-bias action. However, where the diode 30 is in the cathode circuit as set forth in this invention, the cathode is not allowed to pulse positive because the diode 30 connects the cathode to the capacitor 25 which cannot be charged in a single pulse time. Therefore, the target pulse does appear with nearly full amplitude in the output at transformer 12 even though there is a much greater CW interfering or jamming signal present on the IF amplifier pentode 10.

Under the condition of operation where a strong CW signal present in the IF amplifier circuit is suddenly removed, and the cathode voltage of pentode 10 tends to fall to a lower level, it would take several microseconds for capacitor 25 to discharge through the resistance 24 in the oridinary IF circuitry during which time the amplfier would be cut off and a target pulse would be lost. In the cirut of this invention, however, only the capacitor 23 must discharge which allows the cathode voltage of pentode 10 to drop in a fraction of a microsecond. As long as the CW jamming signal is completely removed the target pulse will be properly amplified after jamming even though capacitor 25 is disconnected from the cathode. This occurs because there is no back-bias action on the target signal alone. However, if the CW jamming signal does not decrease all the way to zero, or if it appears at a lower amplitude, the target pulse will be greatly decreased in amplitude because of the practically instantaneous back-bias action with the capacitor 25 disconnected from the cathode. This effect is eliminated in this invention by automatically discharging capacitor 25 through transistor 31 in such a way that the decrease in voltage on capacitor 25 follows very closely the decrease in voltage on the cathode of pentode 10. Then, capacitor 25 will be ready to operate at any jamming level to prevent instantaneous back-bias action of the target pulse. It may be realized that under steady state of increasing signal conditions, transistor 31 is biased off by the forward voltage drop across diode 30. This voltage drop across a diode is usually about 0.5 volt. During an amplitude decrease in the jamming signal on the pentode 10 the cathode voltage drops relative to the voltage on capacitor 25 which reverses the voltage across diode 30. This voltage across diode 30 is now in a direction that transistor 31 (or 31 and 33) is placed into conduction creating a low impedance between its emitter and collector. As the capacitor 25 quickly discharges through this low impedence of transistor 31 the voltage on capacitor 25 drops about as rapidly as the voltage on the cathode of pentode 10 where it stabilizes at substantially the cathode voltage. At this point the transistor 31 (or transistors 31 and 33) is again biased off leaving capacitor 25 charged to substantially the same voltage as the cathode voltage. This rapidly removes the cutoff of pentode 10 so that any target signal appearing at the input of transformer 11, immediately following the removal of jamming signal, will allow pentode 10 to amplify the target signal on the output transformer 12.

The transistor 31 must have fast response so that the voltage on the capacitor 25 follows the cathode voltage down without appreciable delay. It must also have fast recovery so that capacitor 25 will not continue to discharge below the cathode voltage level. If it did overshoot, diode 30 would conduct and pull the cathode voltage down causing an output transient. The transistor 31 should also have high current gain so that the base current, which tends to slow down the discharge of capacitor 23, will be low enough not to greatly increase the cathode time constant of pentode 10. Of course, if the current gain is not sufficiently high with one transistor as shown in FIG. 1, two such transistors as 31 and 33, shown in FIG. 2, may be used. It should be noted that in both circuits the transistor collectors could be grounded but by returning these collectors to the grid biasing voltage at terminal 17 the collector voltage and power dissipation are appreciably decreased. Also the suppressor grid of pentode 10 could be returned to the cathode but the cathode is not well bypassed, therefore the connection as shown in FIGS. 1 and 2 will give better stability to the IF amplifier. The transistor and diode network, as shown by 30, 31, and 33 herein, may be used on more than one IF amplifier stage of a radar receiver dependent on the total dynamic range required. The circuit of this invention applied to one or more of the IF amplfier stages of the radar receiver discloses a circuit which has very large dynamic range without loss of signal gain as in presently known back-biased circuits plus an additional feature that it substantially eliminates the dead time following the sudden removal of a strong CW interfering or jamming signal.

While many modifications and changes may be made in the constructional details and features of the invention as by using NPN type transistors for reversed polarities without departing from the spirit intended, it is to be understood that I desire to be limited in the scope of my invention only as set forth by the appended claims.

I claim:

1. A circuit coupled to the intermediate frequency circuit of a radar receiver to provide fast recovery from jamming signals comprising:
   an intermediate frequency vacuum tube amplifier having a cathode coupled to a neutral potential through a parallel resistance and capacitance network;
   a unidirectional means and a capacitive means coupled in series between said cathode and said neutral potential; and
   an electron emission means coupled to be responsive to the voltage differential across said unidirectional means and coupled through an output to a voltage source to control said unidirectional means and capacitive means for producing a lag in any cathode voltage increase and to conduct to permit rapid cathode voltage decrease.

2. A circuit coupled to the intermediate frequency circuit of a radar receiver to provide fast recovery from jamming signals comprising:
   an intermediate frequency vacuum tube amplifier having a cathod coupled to a neutral potential through a parallel resistance and capacitance network;
   a unidirectional means and a capacitive means coupled in series between said cathode and said neutral potential, said unidirectional means being oriented with the low resistance direction from said cathode to said capacitive means; and
   an electron emission means having inputs thereto coupled across said unidirectional means and an output means coupled to a pre-established potential whereby said cathode is connected to said capacitive means for cathode voltage increases allowing said cathode voltage to increase with storage increase of said capacitive means and said cathode is disconnected from said capacitive means for cathode voltage decreases and said capacitive means is rapidly discharged by conduction of said electron emission means.

3. A circuit as set forth in claim 2 wherein said electron emission means is a PNP transistor in which said inputs are the emitter and base and said output means is said collector.

4. A circuit as set forth in claim 2 wherein said electron emission means consists of a plurality of PNP transistors in cascade with the emitter of the first and the base of the last constituting said two inputs and the collectors thereof constituting said output means.

5. A circuit as set forth in claim 2 wherein said undirectional means is a diode having its anode coupled to the cathode of said intermediate frequency amplifier and its cathode coupled to said capacitive means.

6. A circuit coupled to the intermediate frequency circuit of a radar receiver to provide fast recovery from jamming signals comprising:
   an intermediate frequency pentode amplifier, having an input coupled to the control and suppressor grids and an output coupled to the screen grid and anode, and having a cathode coupled to a neutral potential through a parallel resistance and first capacitance network;
   a diode and a second capacitor coupled in series between said cathode and said neutral potential, said diode being oriented with the anode thereof coupled to said cathode; and
   a PNP transistor switching circuit having a base intput thereto coupled to said pentode cathode, an emitter input thereto coupled to the cathode of said diode, and collector output means coupled to a biasing voltage whereby, upon the occurrence of a jamming signal on the input to said pentode, the cathode voltage thereof will rise in accordance with the charging rate of said second capacitor preventing pentode saturation for a jamming pulse time interval and allowing real target signals to be amplified and, upon reduction of a jamming signal on the input to said pentode, the cathode voltage thereof will decrease producing a voltage differential across the inputs of said transistor switching circuit to switch same into conduction and reduce the second capacitor voltage as rapidly as said jamming signal to immediately relieve back-bias on said pentode allowing real target signals to be amplified.

7. A circuit as set forth in claim 6 wherein said transistor switching circuit includes a single PNP transistor with the collector output biased across a third capacitor voltage storage means.

8. A circuit as set forth in claim 6 wherein said transistor switching circuit includes a pair of PNP transistors coupled in cascade with the base of one and the emitter of the other constituting the inputs, and the collector output means constituting the collector of each transistor, each biased across third and fourth capacitor voltage storage means.

9. A circuit coupled to the intermediate frequency circuit of a radar receiver to provide fast recovery from jamming signals comprising:
   an intermediate frequency pentode amplifier, having an input coupled to the control and suppressor grids and an output coupled to the screen grid and anode, and having a cathode coupled to a neutral potential through a parallel resistance and first capacitance network;

a diode and a second capacitor coupled in series between said pentode cathode and said neutral potential with said diode oriented to be anode coupled to said pentode cathode and cathode coupled to said second capacitor; and a transistor having the base electrode coupled to said pentode cathode, the emitter coupled to the diode cathode, and the collector coupled to a voltage source, said collector being coupled also to one plate of a third capacitor the opposite plate of which is coupled to said neutral potential whereby the pentode cathode will be slow to back-bias the pentode upon the application of a positive going jam signal on the input and will drop in voltage rapidly with any drop in jam signal to remove back-bias from said pentode cathode to allow real target signals to be amplified.

* * * * *